(12) United States Patent
Jeon et al.

(10) Patent No.: US 11,940,942 B2
(45) Date of Patent: Mar. 26, 2024

(54) PERIPHERAL COMPONENT INTERCONNECT EXPRESS INTERFACE DEVICE AND OPERATING METHOD THEREOF

(71) Applicant: SK hynix Inc., Icheon-si (KR)

(72) Inventors: Yong Tae Jeon, Icheon-si (KR); Ji Woon Yang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 108 days.

(21) Appl. No.: 17/527,062

(22) Filed: Nov. 15, 2021

(65) Prior Publication Data

US 2022/0382706 A1 Dec. 1, 2022

(30) Foreign Application Priority Data

Jun. 1, 2021 (KR) .................. 10-2021-0070676

(51) Int. Cl.
*G06F 13/20* (2006.01)
*G06F 13/42* (2006.01)

(52) U.S. Cl.
CPC .. *G06F 13/4221* (2013.01); *G06F 2213/0026* (2013.01)

(58) Field of Classification Search
CPC ......... G06F 13/4221; G06F 2213/0026; G06F 13/382; G06F 13/4282; G06F 13/385; G06F 13/1642; G06F 13/1673
See application file for complete search history.

(56) References Cited

U.S. PATENT DOCUMENTS

| 7,191,255 B2 | 3/2007 | Wong et al. |
| 10,366,044 B2 | 7/2019 | Choi |
| 10,503,679 B2 | 12/2019 | Huang |

(Continued)

FOREIGN PATENT DOCUMENTS

| KR | 10-1565357 B2 | 9/2014 |
| KR | 10-2018-0012201 A | 2/2018 |

(Continued)

OTHER PUBLICATIONS

Non-Final Rejection of U.S. Appl. No. 17/526,995 from USPTO dated Oct. 6, 2022.

(Continued)

*Primary Examiner* — Henry Tsai
*Assistant Examiner* — Kim T Huynh

(57) ABSTRACT

A Peripheral Component Interconnect Express (PCIe) interface device includes a transaction layer generating a transaction packet for transmission of a transaction, a data link layer generating a link packet including a protection code and a sequence number for the transaction packet and a link packet including a sequence number on the basis of the transaction packet, a physical layer generating a physical packet on the basis of the link packet and sequentially outputting the physical packet, a link training module performing negotiation for a link coupled through the physical layer and maintaining data information based on whether a link down occurring when the negotiation for the link is not performed is requested by a host or not, and a PCIe register storing information about the transaction layer, the data link layer, the physical layer, and the link training module.

20 Claims, 14 Drawing Sheets

(56) References Cited

U.S. PATENT DOCUMENTS

| | | |
|---|---|---|
| 10,713,209 B2 | 7/2020 | Jen et al. |
| 2006/0090014 A1 | 4/2006 | Wong |
| 2012/0166699 A1 | 6/2012 | Kumar |
| 2014/0189427 A1* | 7/2014 | Jayaprakash Bharadwaj .............. G06F 11/1415 714/15 |
| 2015/0370683 A1* | 12/2015 | Nishiyama .......... G06F 11/3419 714/43 |
| 2016/0267048 A1 | 9/2016 | Pethe et al. |
| 2017/0357609 A1 | 12/2017 | Long |
| 2018/0349310 A1* | 12/2018 | Koriginja Ramaswamy .............. G06F 13/4081 |
| 2019/0303342 A1 | 10/2019 | Jen et al. |
| 2020/0192850 A1 | 6/2020 | Caruk et al. |
| 2020/0226084 A1* | 7/2020 | Das Sharma .......... H04L 45/24 |
| 2020/0349064 A1 | 11/2020 | Lim |
| 2020/0371579 A1 | 11/2020 | Selvam et al. |
| 2021/0073157 A1 | 3/2021 | Olarig |
| 2021/0318815 A1 | 10/2021 | Olarig |
| 2022/0342841 A1* | 10/2022 | Choudhary ......... G06F 13/4221 |
| 2022/0382706 A1* | 12/2022 | Jeon .................... G06F 13/4221 |

FOREIGN PATENT DOCUMENTS

| | | |
|---|---|---|
| KR | 10-2018-0037783 A | 4/2018 |
| KR | 10-2018-0095765 A | 8/2018 |
| KR | 10-2020-0010139 A | 1/2020 |

OTHER PUBLICATIONS

Non-Final Rejection of U.S. Appl. No. 17/527,032 from USPTO dated Feb. 8, 2023.

"PCI Express® Base Specification Revision 4.0 Version 1.0", Sep. 27, 2017.

"PCI Express® Base Specification Revision 5.0 Version 1.0", May 22, 2019.

\* cited by examiner

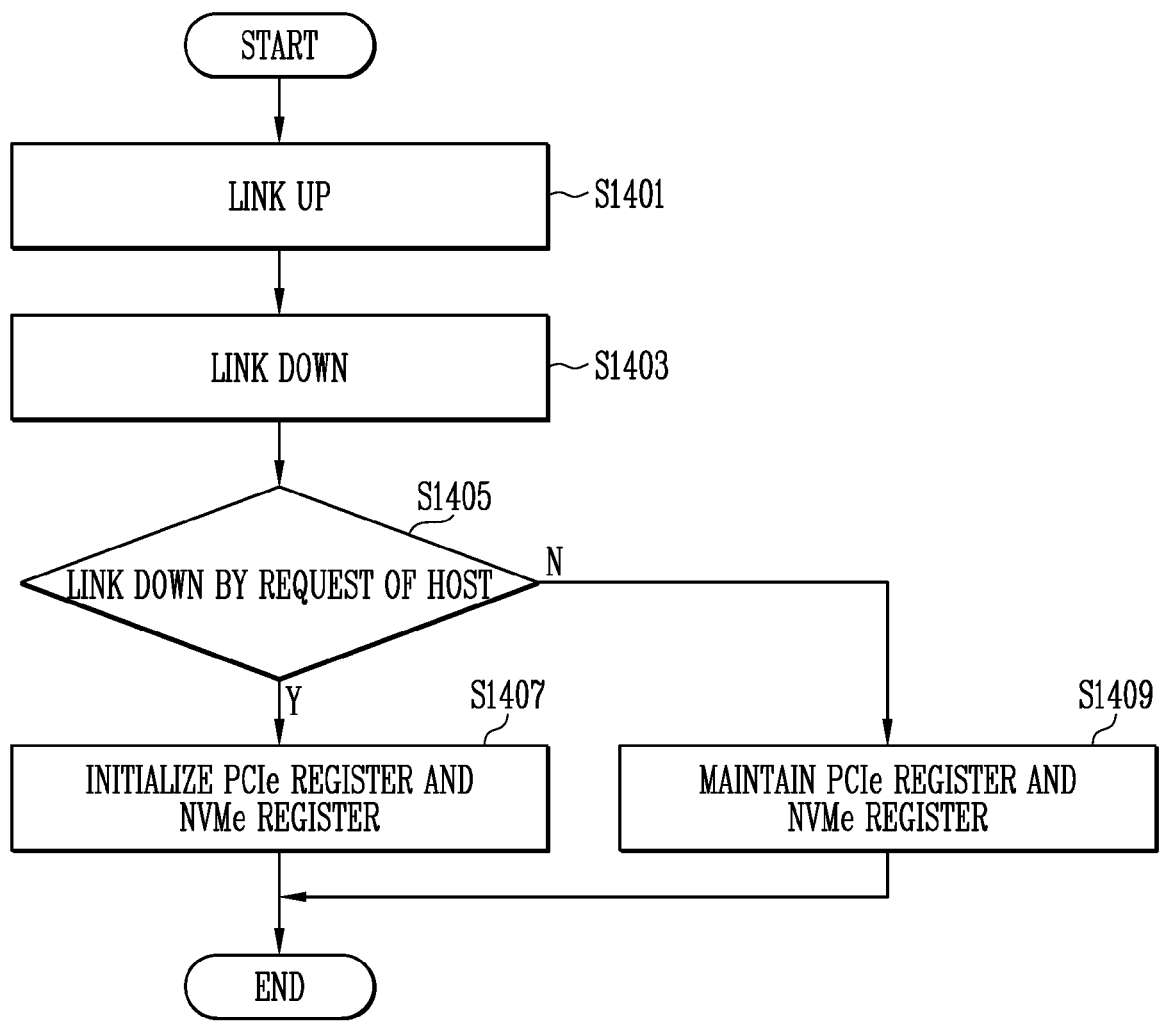

PERIPHERAL COMPONENT INTERCONNECT EXPRESS INTERFACE DEVICE AND OPERATING METHOD THEREOF

CROSS-REFERENCE TO RELATED APPLICATION

The present application claims priority under 35 U.S.C. § 119(a) to Korean patent application number 10-2021-0070676, filed on Jun. 1, 2021, in the Korean Intellectual Property Office, the entire disclosure of which is incorporated herein by reference.

BACKGROUND

1. Technical Field

Various embodiments generally relate to an electronic device, and more particularly, to a Peripheral Component Interconnect Express (PCIe) interface device and a method of operating the PCIe interface device.

2. Related Art

Peripheral Component Interconnect Express (PCIe) refers to an interface with a serial configuration for data communication. A PCIe-based storage device may support multi-port and multi-function. A PCIe-based storage device may be virtualized or non-virtualized and achieve Quality of Service (QoS) of host I/O commands through at least one PCIe function.

A storage device may store data under the control of a host device such as a computer or a smart phone. A storage device may include a memory device storing data and a memory controller controlling the memory device. Memory devices may be divided into volatile memory devices and non-volatile memory devices.

A volatile memory device may retain data as long as power is being supplied, and may lose stored data in the absence of power supply. Types of volatile memory devices may include Static Random Access Memory (SRAM), Dynamic Random Access Memory (DRAM), and the like.

A non-volatile memory device does not lose data even in the absence of power supply. Types of non-volatile memory devices may include Read Only Memory (ROM), Programmable ROM (PROM), Electrically Programmable ROM (EPROM), Electrically Erasable and Programmable ROM (EEPROM), flash memory, and the like.

SUMMARY

Various embodiments of the present disclosure are directed to a PCIe interface device completing processing of a command when a link down that is not intended by a host occurs, and methods of operating the PCIe device.

According to an embodiment, a Peripheral Component Interconnect Express (PCIe) interface device may include a transaction layer generating a transaction packet for transmission of a transaction, a data link layer generating a link packet including a protection code and a sequence number for the transaction packet on the basis of the transaction packet, a physical layer generating a physical packet on the basis of the link packet and sequentially outputting the physical packet, a link training module performing negotiation for a link coupled through the physical layer and maintaining data information based on whether a link down occurring when the negotiation for the link is not performed is requested by a host or not, and a PCIe register storing the data information about the transaction layer, the data link layer, the physical layer, and the link training module.

According to an embodiment, a method of operating a Peripheral Component Interconnect Express (PCIe) interface device may include generating, by a transaction layer, a transaction packet to transmit a transaction, generating, by a data link layer, a link packet including a protection code and a sequence number for the transaction packet on the basis of the transaction packet, generating, by a physical layer, a physical packet on the basis of the link packet, and sequentially outputting the physical packet, performing negotiation for a link coupled through the physical layer by transmitting and receiving the physical packet, and maintaining data information based on whether a link down occurring when the negotiation for the link is not performed is requested by the host or not.

BRIEF DESCRIPTION OF THE DRAWINGS

FIG. 14 is a diagram illustrating a method of operating a PCIe interface device according to an embodiment of the present disclosure.

DETAILED DESCRIPTION

Specific structural or functional descriptions of examples of embodiments in accordance with concepts that are disclosed in this specification are illustrated only to describe the examples of embodiments in accordance with the concepts. Examples of embodiments in accordance with the concepts may be carried out in various forms, however, and the descriptions are not limited to the examples of embodiments described in this specification.

Figure 1:
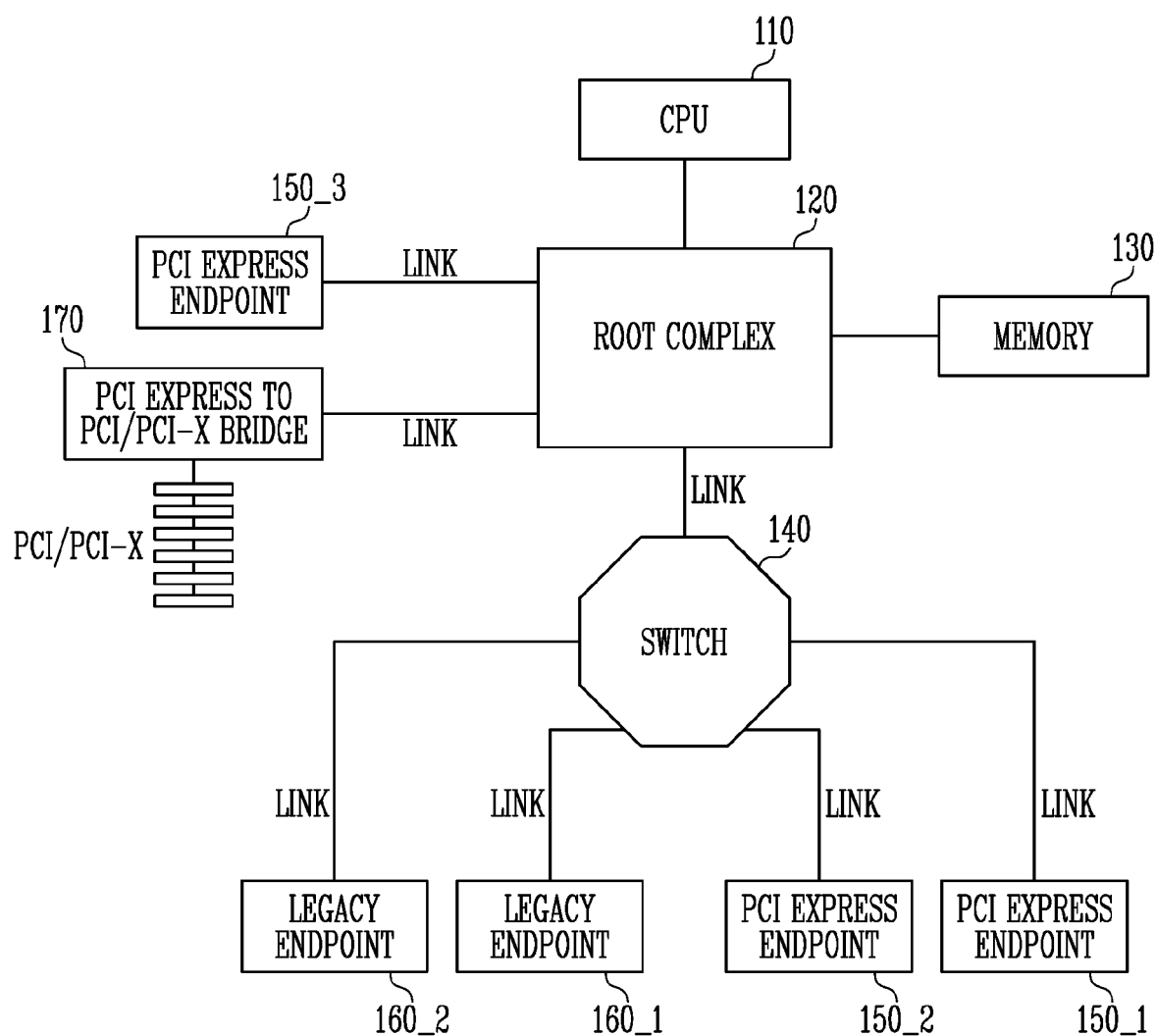
FIG. 1 is a block diagram illustrating a PCIe interface device according to an embodiment of the present disclosure.

FIG. 1 is a block diagram illustrating a peripheral component interconnect express (PCIe) interface device according to an embodiment of the present disclosure.

Referring to FIG. 1, a PCIe interface device 100 may include a central processing unit (CPU) 110, a root complex 120, a memory 130, a switch 140, PCIe endpoints 150_1 to 150_3, legacy endpoints 160_1 and 160_2, and a PCIe to PCI/PCI-X bridge 170.

In FIG. 1, the root complex 120 may be coupled to each of the switch 140, the PCIe endpoints 150_1 to 150_3 and the PCIe to PCI/PCI-X bridge 170 through a link LINK. In addition, the switch 140 may be coupled to each of the PCIe endpoints 150_1 to 150_3 and the legacy endpoints 160_1 and 160_2 through a link LINK. A link LINK may include at least one lane.

According to an embodiment, the root complex 120 may connect the CPU 110 and the memory 130 to an input/output (I/O) hierarchy.

More specifically, the root complex 120 may support a PCIe port. In other words, the root complex 120 may support a root port that may be coupled to an input/output (I/O) device.

In addition, the root complex 120 may support interlayer routing of each configuration included in the PCIe interface device 100. Routing may refer to an operation of selecting a path from a transmission side to a reception side in data communication. Routing may be performed using a method of setting a path in advance from a transmission side to a reception side or a method of selecting a path with the highest efficiency according to a status of a system or a network.

In addition, the root complex 120 may support input/output (I/O) requests. The root complex 120 may support generation of configuration requests. However, the root complex 120 may not support locking semantics as a completer. The root complex 120 may support generation of locked requests as a requester.

According to an embodiment, the root complex 120 may split a packet into smaller packets transmitted between hierarchies. In addition, the root complex 120 may generate I/O requests.

According to an embodiment, the switch 140 may include two or more logical PCI-to-PCI bridges. Each of the two or more logical PCI-to-PCI bridges may be coupled to an upstream port or a downstream port.

The switch 140 may transmit a transaction using a PCI bridge mechanism (address-based multicasting). The switch 140 may transmit all types of transaction layer packets (also referred as transaction packets) (TLPs) through the upstream port and the downstream port. In addition, the switch 140 may support locked requests. Each port of the enabled switch 140 may support flow control. The switch 140 may implement arbitration using round robin or weighted round robin schemes when contention occurs on the same virtual channel.

According to an embodiment, unlike the root complex 120, the switch 140 may be unable to split a packet into smaller packets transmitted between hierarchies.

According to an embodiment, each of the PCIe endpoints 150_1 to 150_3 and the legacy endpoints 160_1 and 160_2 may serve as a requester or a completer of a PCIe transaction. Transaction layer packets (TLPs), which are transmitted or received by the PCIe endpoints 150_1 to 150_3 and the legacy endpoints 160_1 and 160_2, may provide configuration space headers. In addition, each of the PCIe endpoints 150_1 to 150_3 and the legacy endpoints 160_1 and 160_2 may provide a configuration request as a completer.

According to an embodiment, the PCIe endpoints 150_1 to 150_3 and the legacy endpoints 160_1 and 160_2 may be classified depending on the possible size of the memory transaction. For example, when a memory transaction exceeding 4 GB is possible, an endpoint may be a PCIe end point (150_1 to 150_3). On the other hand, when a memory transaction exceeding 4 GB is not possible, an endpoint may be a legacy endpoint (160_1 and 160_2). While the PCIe endpoints 150_1 to 150_3 are not permitted to generate I/O requests, the legacy endpoints 160_1 and 160_2 may provide or generate I/O requests.

According to an embodiment, the PCIe endpoint 150_3 may transmit or receive the TLPs to or from the root complex 120. In addition, PCI/PCI-X may transmit or receive the TLPs to or from the root complex 120 through the PCIe to PCI/PCI-X bridge 170. In addition, the PCIe endpoints 150_1 and 150_2 and the legacy endpoints 160_1 and 160_2 may transmit or receive the TLPs to or from the switch 140.

According to an embodiment, the switch 140 may transmit the TLPs received from the PCIe endpoints 150_1 and 150_2 and the legacy endpoints 160_1 and 160_2 to the root complex 120. The switch 140 may transmit the TLPs received from the root complex 120 to the PCIe endpoint 150_3 or the PCI/PCI-X (not illustrated).

According to an embodiment, the root complex 120 may directly transmit or receive TLPs to or from the PCIe endpoint 150_3. The root complex 120 may transmit or receive TLPs to or from the PCIe endpoints 150_1 and 150_2 and the legacy endpoints 160_1 and 160_2 through the switch 140. The root complex 120 may transmit the TLPs received from the PCIe endpoints 150_1 and 150_2 and the legacy endpoints 160_1 and 160_2 to the CPU 110 or the memory 130.

Figure 2:
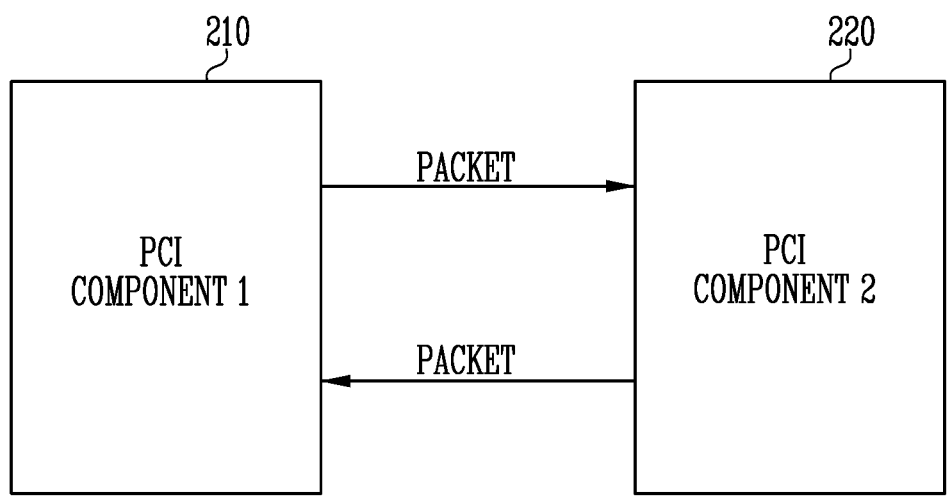
FIG. 2 is diagram illustrating transmission of packets between configurations included in a PCIe interface device according to an embodiment of the present disclosure.

FIG. 2 is diagram illustrating transmission of packets between configurations included in a PCIe interface device according to an embodiment of the present disclosure.

Referring to FIGS. 1 and 2, each of the PCIe components 1 and 2 as shown in FIG. 2 may be one of the root complex 120, the switch 140, the PCIe endpoints 150_1 to 150_3, the legacy endpoints 160_1 and 160_2, and the PCIe to PCI/PCI-X bridge 170 as shown in FIG. 1. In other words, each of the PCIe components 1 and 2 as shown in FIG. 2 may be one of the components coupled to another component through a link LINK. The link LINK may include at least one lane.

According to an embodiment, the PCIe components 1 and 2 may transmit or receive packets through a link LINK. In other words, each of the PCIe components 1 and 2 may serve as a transmitter TX for transmitting packets or a receiver RX for receiving packets.

According to an embodiment, a packet may be an information transmission unit and consist of selective TLP prefixes, headers and payloads.

According to an embodiment, latency may be reduced by not snooping packets that require no caching. When there is no dependency between transactions, packet operation performance may be improved by changing ordering. In addition, by modifying ordering based on an ID, packet operation performance may be improved.

Figure 3:
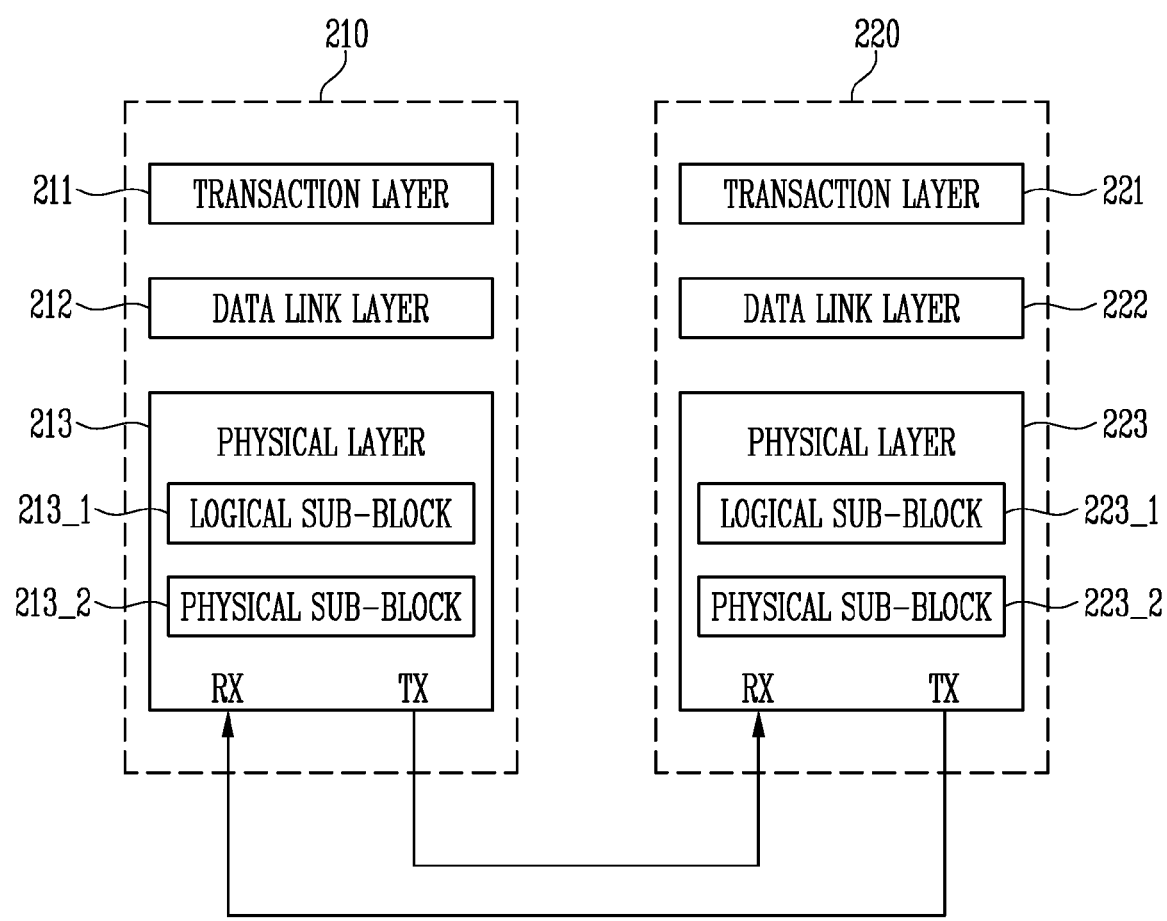
FIG. 3 is a diagram illustrating layers included in each of the configurations included in a PCIe interface device according to an embodiment of the present disclosure.

FIG. 3 is a diagram illustrating layers included in each of the configurations included in a PCIe interface device according to an embodiment of the present disclosure.

Referring to FIGS. 2 and 3, FIG. 3 illustrates layers included in each of the PCIe component 1 210 and PCIe component 2 220 of FIG. 2. In FIG. 3, the PCIe components 1 and 2 may include transaction layers 211 and 221, data link layers 212 and 222, and physical layers 213 and 223, respectively. The physical layers 213 and 223 may respectively include logical sub-blocks 213_1 and 223_1 and physical sub-blocks 213_2 and 223_2.

According to an embodiment, the transaction layers 211 and 221 may assemble or disassemble transaction layer packets (TLPs). A transaction layer packet (TLP) may be used to process transactions (i.e., a certain type of event) such as transmit read and write transactions.

The transaction layers 211 and 221 may manage credit-based flow control. In addition, the transaction layers 211 and 221 may support various formats of addressing depending on the type of the transaction. For example, the transaction layers 211 and 221 may support addressing with respect to memory, I/O, configuration, and message.

According to an embodiment, the transaction layers 211 and 221 may perform initialization and configuration functions. More specifically, the transaction layers 211 and 221 may store link configuration information generated by a processor or a management device. In addition, the transaction layers 211 and 221 may store link attributes related to bandwidth and frequency determined by the physical layers 213 and 223.

According to an embodiment, the transaction layers 211 and 221 may generate and process packets. More specifically, the transaction layers 211 and 221 may generate TLPs requested by a device core and convert the received TLPs into a payload or status information. In addition, the transaction layers 211 and 221 may generate cyclic redundancy codes (CRCs) and update the TLP header when end-to-end data integrity is supported.

According to an embodiment, the transaction layers 211 and 221 may perform flow control. More specifically, the transaction layers 211 and 221 may track flow control credits for TLPs across the link. In addition, the transaction layers 211 and 221 may periodically receive the transaction credit status through the data link layers 212 and 222. The transaction layers 211 and 221 may control TLP transmission based on flow control information.

According to an embodiment, the transaction layers 211 and 221 may implement power management. More specifically, the transaction layers 211 and 221 may manage power according to instructions of system software. In addition, when power is turned on, the transaction layers 211 and 221 may perform autonomous power management according to instructions of hardware.

According to an embodiment, the transaction layers 211 and 221 may provide virtual channel mechanisms and traffic class identification for certain classes of applications. The transaction layers 211 and 221 may provide independent logical data flows over predetermined physical resources. In addition, the transaction layers 211 and 221 may apply appropriate servicing policies by providing different orderings through packet labeling.

According to an embodiment, the responsibilities of the data link layers 212 and 222 may include link management, data integrity, error detection, and error correction. The data link layers 212 and 222 may generate a link packet including a protection code and a sequence number for the transaction packet and a link packet including a sequence number based on the transaction packet. The data link layers 212 and 222 may apply a data protection code and a TLP sequence number to TLPs to be transmitted, and may transmit the data protection code and the TLP sequence number to the physical layers 213 and 223. In addition, the data link layers 212 and 222 may check the integrity of the received TLPs from the physical layers 213 and 223 and may transmit the TLPs to the transaction layers 211 and 221.

When errors in the TLPs are detected, the data link layers 212 and 222 may receive TLPs with no errors, or may request retransmission of TLPs until the link is determined to have a fail status. The data link layers 212 and 222 may generate and consume data link layer packets (also referred as link packets) (DLLPs) that are used for link management.

According to an embodiment, the data link layers 212 and 222 may exchange reliable information. In addition, the data link layers 212 and 222 may perform initialization and power management. More specifically, the data link layers 212 and 222 may transmit power status requests of the transaction layers 211 and 221 to the physical layers 213 and 223, respectively. In addition, the data link layers 212 and 222 may transmit information about enable/disable, reset, disconnection, and power management states to the transaction layers 211 and 221.

According to an embodiment, the data link layers 212 and 222 may perform data protection, error checking, and facilitate retry transmissions. More specifically, the data link layers 212 and 222 may generate CRCs. In addition, the data link layers 212 and 222 may store the transmitted TLPs to enable retry for the TLPs. The data link layers 212 and 222 may check the TLPs, transmit retry messages, and display errors for error reporting and logging.

According to an embodiment, the physical layers 213 and 223 may include a configuration for operating an interface, such as a driver, an input buffer, a parallel-to-serial or serial-to-parallel converter, and a phase locked loop (PLL).

According to an embodiment, the physical layers 213 and 223 may convert packets received from the data link layers 212 and 222 into a serialized format to transmit the packets. In addition, the physical layers 213 and 223 may set bandwidth and frequency depending on compatibility with a device or component connected to the other side of the link. The physical layers 213 and 223 may perform parallel-to-serial conversion and then serial-to-parallel conversion of the packets for serial data communication. In other words, the physical layers 213 and 223 may each function as a serializer or a deserializer.

According to an embodiment, the physical layers 213 and 223 may perform interface initialization, maintenance control, and status tracking. More specifically, the physical layers 213 and 223 may perform interconnect power management. In addition, the physical layers 213 and 223 may negotiate bandwidth and lane mapping between components and invert lane polarity.

The physical layers 213 and 223 may generate symbols and serial ordered sets. In addition, the physical layers 213 and 223 may transmit and align the generated symbols.

According to an embodiment, the physical layers 213 and 223 may serve as a transmitter or a receiver of packets between PCIe components. In other words, the physical layers 213 and 223 may convert the packets received through the transaction layers 211 and 221 and the data link layers 212 and 222, and may transmit the converted packets to other PCIe components. In addition, the physical layers 213 and 223 may convert packets received from other PCIe components to transmit the converted packets to the transaction layers 211 and 221 through the data link layers 212 and 222. The physical layers 213 and 223 may generate a physical packet based on the link packet and sequentially outputting the physical packet.

According to an embodiment, each of the logical sub-blocks 213_1 and 223_1 included in the physical layers 213 and 223 may consist of two sections. One of the two sections may be a transmitter section that prepares for transmission of information that was transmitted from the data link layers 212 and 222 to the physical sub-blocks 213_2 and 223_2. The other section may be a receiver section that identifies and prepares received information before outputting the information to the data link layers 212 and 222.

According to an embodiment, each of the physical sub-blocks 213_2 and 223_2 included in the physical layers 213 and 223 may be an electrical sub-block that supports, commonly or individually, an independent reference clock architecture. In addition, the physical sub-blocks 213_2 and 223_2 may reduce swing for a low power link operation, detect an in-band receiver, and detect an electrical idle state.

Figure 4:
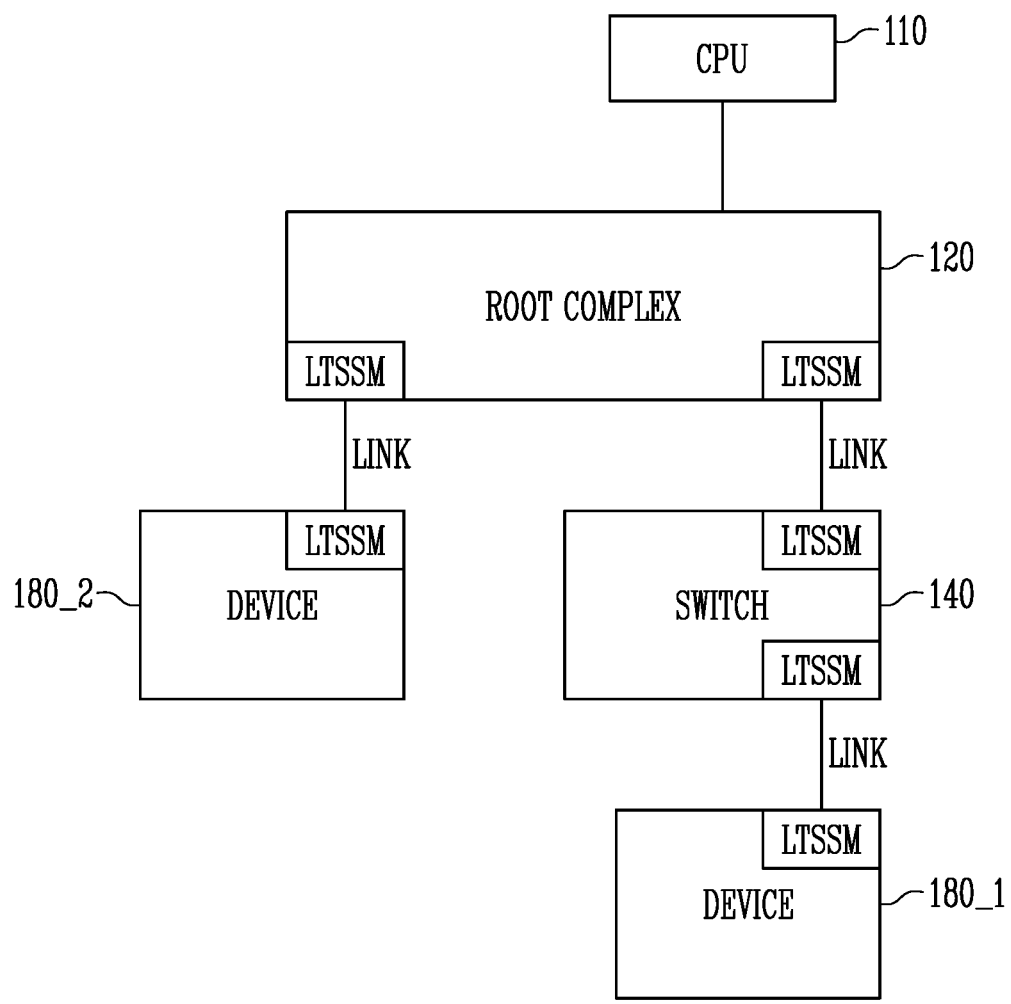
FIG. 4 is a diagram illustrating Link Training & Status State Machines (LTSSMs) according to an embodiment of the present disclosure.

FIG. 4 is a diagram illustrating Link Training & Status State Machines (LTSSMs) according to an embodiment of the present disclosure.

Referring to FIGS. 1 and 4, FIG. 4 shows a CPU 110, a root complex 120, a switch 140, and devices 180_1 and 180_2 (connected to endpoints). Each of the components of FIG. 4 may include a Link Training & Status State Machine (also referred as a link training module) (LTSSM). An LTSSM may exchange training sequences (e.g., TS1 and TS2) for negotiation of a plurality of link parameters such as polarity of a lane configuring a link that connects respective components, the number of links or lanes, equalization, and data transmission speed. An LTSSM may perform negotiation for a link coupled through the physical layer and maintain a data information on whether a link down, occurring when the negotiation for the link is not performed, is requested by a host.

According to an embodiment, in a PCIe environment, an LTSSM may be a hardware-based processor that is controlled by a physical layer (213 or 223 of FIG. 3) and that enables packet transmission by configuring and initializing a link and a port between the components for a normal operation. A link may have one of the eleven states, including detect and polling states, and each state may have a sub-state.

Flow between various states that a link may have will be described below in more detail with reference to FIG. 5.

According to an embodiment, in order to configure a port for connecting components, each individual link may require a separate LTSSM. For example, in order to configure a port for connecting the root complex 120 and the device 180_2, each of the root complex 120 and the device 180_2 may include an LTSSM. In addition, in order to configure a port for connecting the root complex 120 and the switch 140, each of the root complex 120 and the switch 140 may include an LTSSM. Further, in order to configure a port for connecting the switch 140 and the device 180_1, each of the switch 140 and the device 180_1 may include an LTSSM.

According to an embodiment, a port closer to the root complex 120, from among the ports of the switch 140, may be an upstream port, and a port farther away from the root complex 120 may be a downstream port. The upstream port and the downstream port may exchange training sequences (e.g., TS1 and TS2) with the root complex 120 and the device 180_1, respectively, for synchronization of LTSSM transitions. For synchronization of the LTSSM transitions, the upstream port and the downstream port may be independent from each other and may not influence each other.

According to an embodiment, the CPU 110 may not be influenced by the LTSSM of each component. Therefore, when a link down that is unintended by the host occurs, a blue screen error may result.

Figure 5:
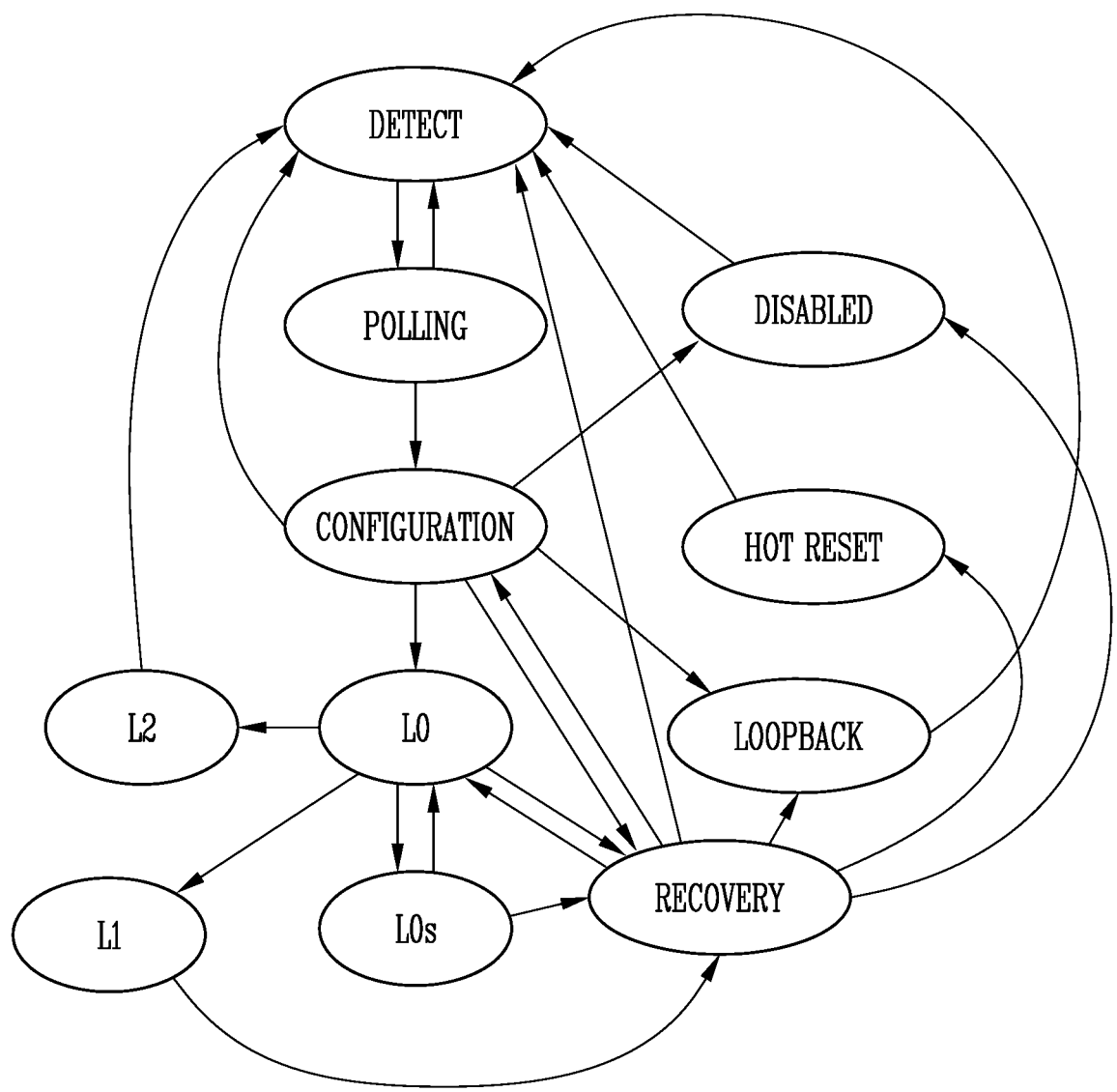
FIG. 5 is a diagram illustrating states of an LTSSM according to an embodiment of the present disclosure.

FIG. 5 is a diagram illustrating states of an LTSSM according to an embodiment of the present disclosure.

Referring to FIGS. 4 and 5, the states in FIG. 5 illustrate each step in the synchronization of LTSSM transitions.

According to an embodiment, a DETECT step may refer to a step at which a link connected to both ends of the PCIe components 1 and 2 of FIG. 2 is detected. In other words, a search for a physically coupled lane may take place in the DETECT step.

The DETECT step may be an initial step of an LTSSM and entered after reset or at the time of booting. In addition, at the DETECT step, all logics, ports and registers may be reset. The DETECT step may be entered when directed. The LTSSM may enter a POLLING step from the DETECT step.

According to an embodiment, in the POLLING step, a lane that enables data communication may be distinguished from among the detected lanes. In other words, in the POLLING step, clocks at both ends of the PCIe components 1 and 2 may be synchronized, and the lane may be checked for polarity (D+ or D−) and available data transmission speed. Further, in the POLLING step, a boundary between continuous bits in data may be checked. According to an embodiment, the LTSSM may proceed to a CONFIGURATION step from the POLLING step.

According to an embodiment, in the CONFIGURATION step, a connection state of the lane may be checked. For example, in the CONFIGURATION step, a lane width that enables data communication may be determined. In addition, in the CONFIGURATION step, a bit that is marked as PAD of training sequences may be changed into a negotiated number, and negotiation for best performance of both devices may be carried out. In the CONFIGURATION step, the transmitter and the receiver may transmit and receive data at negotiated data transmission and reception rates. In addition, in the CONFIGURATION step, lane to lane de-skew, in which parallel bit streams of various lanes arrive at difference devices at different times, may be solved.

According to an embodiment, in the CONFIGURATION step, the LTSSM may proceed to the DETECT step, an L0 step, a RECOVERY step, a LOOPBACK step, or a DISABLED step.

According to an embodiment, in the L0 step, data and control packets may be normally transmitted and received. In other words, transaction layer packets (TLPs) and data link layer packets (DLLPs) may be transmitted and received. In addition, all power management states may start from the L0 step. The L0 step may be a normal operational state. The L0 step may be a fully active state.

According to an embodiment, the LTSSM may proceed to an L1 step, an L2 step, an L0s step, or the RECOVERY step from the L0 step.

According to an embodiment, each of the L0s step, the L1 step, and the L2 step may be intended or used as a power savings state.

More specifically, the L0s step may be a sub-state of the L0 step. The L0s step may allow the link to quickly enter into and recover from a power conservation state without going through the RECOVERY step. In addition, the transition from the L0s step to the L0 step may re-establish bit lock, symbol lock and Lane to Lane De-skew. The transmitter and the receiver of the ports at both ends may not necessarily be in the L0s step simultaneously to return to the L0 step. The LTSSM may transition to the L0 step or the RECOVERY step from the L0s step.

More specifically, although the L1 step returns to the L0 step more slowly than the L0s step returns to the L0 step, the L1 step may allow additional power savings over the L0 step at the cost of additional resume latency. The L1 step may be entered by active state power management (ASPM) or Power Management Software. The ASPM may refer to a policy that changes the link to a power savings state when a device connected via PCIe is not used. The power management software may refer to a policy that changes the device connected via PCIe to the power savings state.

In addition, the entry to the L1 step may occur after being directed by the data link layer (212 or 222 in FIG. 3) and receiving an electrical idle ordered set (EIOS). The LTSSM may proceed to the RECOVERY step from the L1 step.

More specifically, power may be aggressively conserved in the L2 step, and the transmitter and the receiver of the PCIe-connected device may be shut off. In the L2 step, power and clocks may not be guaranteed, but AUX power may be available. The entry into the L2 step may occur after being directed by the data link layer (212 or 222 in FIG. 3) and receiving an electrical idle ordered set (EIOS). The LTSSM may proceed to the DETECT step from the L2 step.

According to an embodiment, the RECOVERY step may be entered when an error occurs in the L0 step, and may transition again to the L0 step after error recovery. In addition, the RECOVERY step may be entered when returning to the L0 step from the L1 step, and the process flow may transition to the RECOVERY step when a LOOPBACK step, a HOT RESET step, or a DISABLED step is entered.

In the RECOVERY step, bit lock, symbol lock or block alignment, and lane-to-lane de-skew may be re-established. In addition, in the RECOVERY step, a speed of a lane may be changed.

According to an embodiment, the LTSSM may enter the L0 step, the CONFIGURATION step, the DETECT step, the LOOPBACK step, the HOT RESET step, or the DISABLED step from the RECOVERY step.

According to an embodiment, the LOOPBACK step may be intended for test and entered when a bit error rate is measured. The LOOPBACK step may reset the link and use bit 2 in the training control field of the training sequences (e.g. TS1 and TS2), and the receiver may re-transmit all received packets. The LTSSM may measure the bit error rate in the LOOPBACK step and proceed to the DETECT step.

According to an embodiment, the HOT RESET step may reset the link and use bit 0 in the training sequences (e.g., TS1 and TS2). The LTSSM may proceed to the DETECT step from the HOT RESET step.

According to an embodiment, the DISABLED step may cause the transmitter to be in an electrical idle state when the receiver is in a low impedance state. In the DISABLED step, the link may be disabled until the electrical idle state is terminated. The DISABLED step may use bit 1 in the training control field of the training sequences (e.g. TS1 and TS2). The LTSSM may enter the DISABLED step when being directed by an upper step. The LTSSM may enter the DETECT step from the DISABLED step.

In FIG. 5, a link up may indicate a transition from the DETECT step, via the POLLING step and the CONFIGURATION step, to the L0 step, and a link down may indicate transition again to the DETECT step.

In addition, the LTSSM may set a link up register value at each step. For example, when a link up register has a value of '1', the link up register may be in a link up state, and when the link up register has a value of '0', the link up register may have a link down state. When the LTSSM enters the L0 step for the first time, the link up register may be set to '1'.

More specifically, the link up register corresponding to the DETECT step, the POLLING step, the CONFIGURATION step, the LOOPBACK step, the HOT RESET step, and the DISABLED step may be set to '0'. The link up register corresponding to the L0 step, the L0s step, the L1 step and the L2 step may be set to '1'.

According to an embodiment, during a link down, data may be flushed, and the PCIe register and the NVMe register may be reset. Therefore, the host may initialize the PCIe register and the NVMe register. When a link down is intended by the host, the host may initialize PCIe and NVMe. The PCIe register may store information about the transaction layer, the data link layer, the physical layer, and the link training module, and include the data information included in an NVMe module coupled to an endpoint.

However, in case of a sudden link down, which is not intended by the host, for example, failures may occur, such as for example, failures to change a data transmission and reception rate, failures to change a lane, and failures to terminate power savings. In addition, an LTSSM timeout may occur, and the LTSSM may transition to the DETECT step. An unintended sudden link down may be a link down between two ports. Thus, an OS and an NVMe driver may not perceive the sudden link down. Therefore, the host may try to access a device without initializing PCIe and NVMe, and a blue screen or interruption of a host operation may occur due to the reset values.

Figure 6:
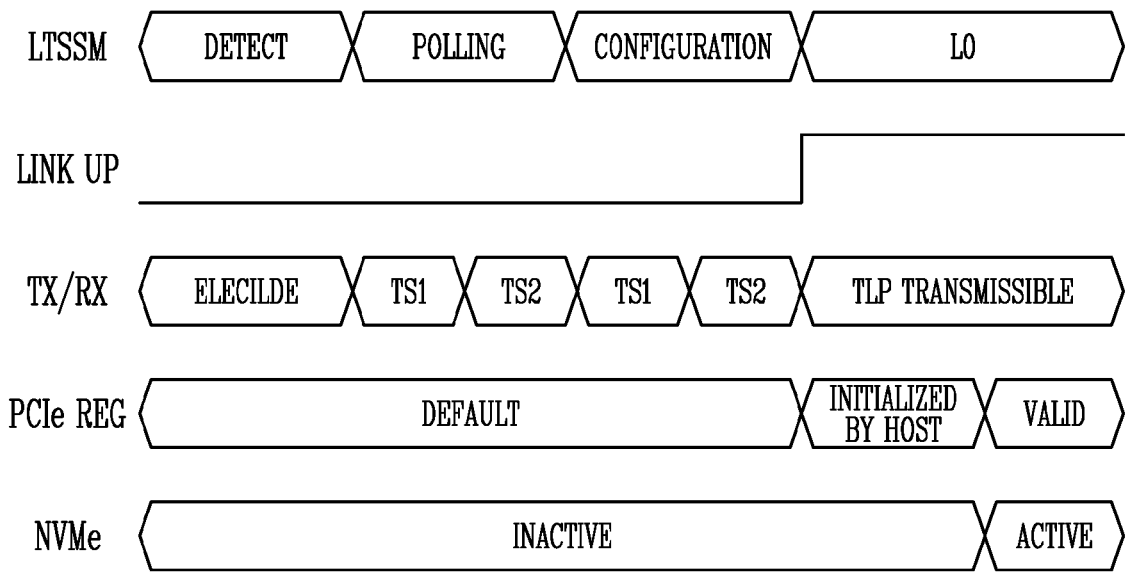
FIG. 6 is a diagram illustrating a link up process according to an embodiment of the present disclosure.

FIG. 6 is a diagram illustrating a link up process according to an embodiment of the present disclosure.

Referring to FIGS. 5 and 6, FIG. 6 illustrates a link up process through the steps illustrated by FIG. 5, in addition to steps of a PCIe register (PCIe REG) and NVMe.

According to an embodiment, an LTSSM may transition from a DETECT step through a POLLING step and a CONFIGURATION step, to an L0 step, which is referred to as a link up. In the L0 step, the LTSSM may normally transmit and receive transaction layer packets (TLPs) and data link layer packets (DLLPs).

According to an embodiment, the receiver RX and the transmitter TX at both ports connected through the link may be in an electrically idle state (ELECIDLE). In addition, the receiver RX and the transmitter TX at both ports may synchronize the LTSSM transitions by transmitting and receiving training sequences (e.g., TS1 and TS2) in the POLLING step and the CONFIGURATION step. In the L0 step, the receiver RX and the transmitter TX at both ports may be in a state (TLP TRANSMISSIBLE), in which the receiver RX and the transmitter TX transmit and receive transaction layer packets (TLPs).

According to an embodiment, the PCIe register (PCIe REG) may be in a default state (DEFAULT) during the DETECT step, the POLLING step and the CONFIGURATION step. The PCIe register (PCIe REG) may be initialized by the host in the L0 step and may then be in a valid state.

According to an embodiment, the NVMe register may remain inactive state (INACTIVE) until the PCIe register (PCIe REG) is initialized, and may be active state (ACTIVE) after the PCIe register (PCIe REG) is initialized.

Figure 7:
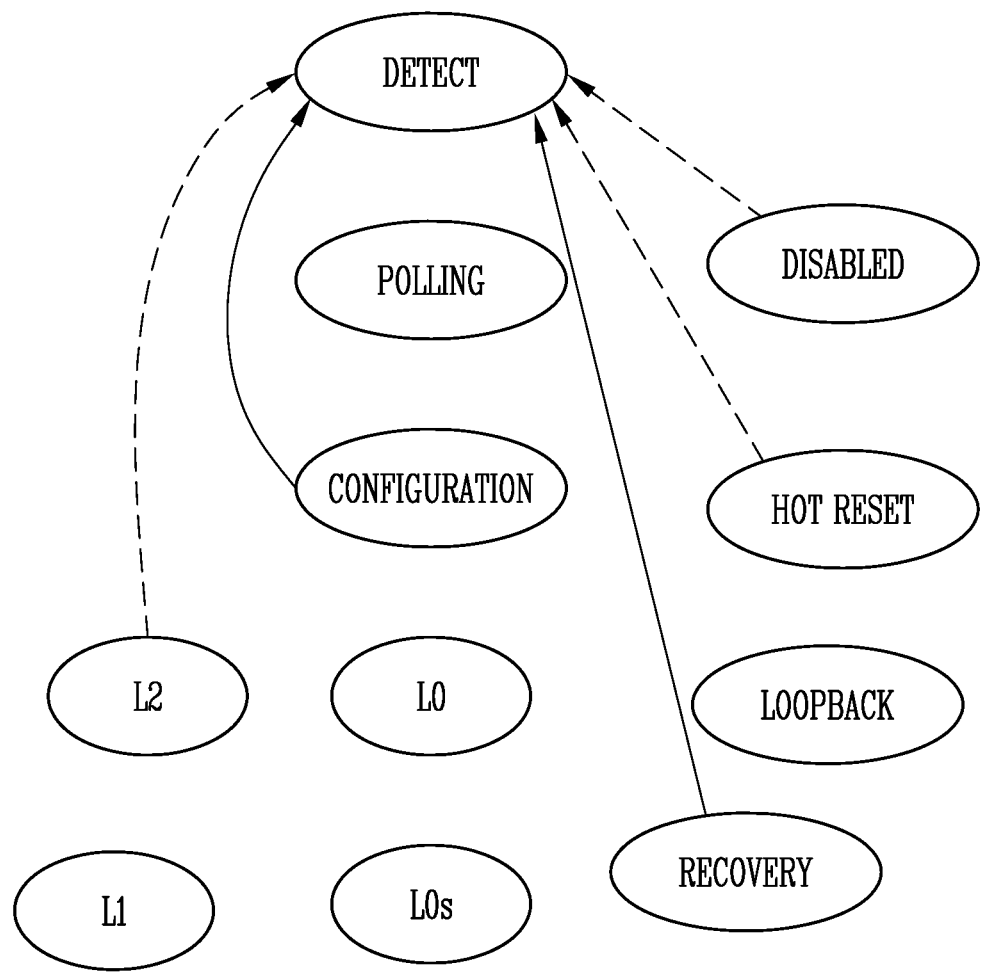
FIG. 7 is a diagram illustrating a link down that is intended by a host and a link down that is not intended by the host according to an embodiment of the present disclosure.

FIG. 7 is a diagram illustrating a link down that is intended by a host and a link down that is not intended by the host according to an embodiment of the present disclosure.

Referring to FIGS. 5 and 7, FIG. 7 illustrates an intentional link down by the host and an unintentional link down by the host. In FIG. 7, a transition indicated by dashed lines may correspond to an intentional link down by the host, and a transition indicated by solid lines may correspond to an unintentional link down by the host.

According to an embodiment, an intentional link down by the host and an unintentional link down by the host may be distinguished from each other based on the step prior to transitioning to the DETECT step.

For example, when a step before transitioning to the DETECT step is the L2 step, the HOT RESET step, or the DISABLED step, a link down may correspond to an intentional link down by the host. In addition, in another example, when a cold reset or a warm reset is performed, a link down may be an intentional link down by the host. A cold reset may refer to a start of link training when power is re-applied after a power on reset (POR), and a warm reset may refer to a reset that occurs while power is maintained.

However, when the step right before transitioning to the DETECT step is the CONFIGURATION step or the RECOVERY step, a link down may correspond to an unintentional link down by the host. The unintentional link down by the host may proceed from the DETECT step to the L0 step when a timeout occurs in the CONFIGURATION step or the RECOVERY step, which may take place after an L0 step.

Thus, a method is disclosed for distinguishing between a link down intended by the host from a link down not intended by the host, including maintaining a PCIe register and an NVMe register in the case of a sudden link down that is not intended by the host.

More specifically, to differentiate an intentional link down by the host from a sudden link down that is not intended by the host, when the link up register changes from '1' to '0', the LTSSM may separately store information about the current step right before the step change.

According to an embodiment, when the step that is changed is the LOOPBACK step, the HOT RESET step, or the DISABLED step, the link down may be an intentional link down by the host regardless of the immediately prior step.

According to an embodiment, when the step that is changed is the DETECT step, the LTSSM may check the step immediately prior to the DETECT step. For example, when a step right before changing to the DETECT step is the L2 step, the HOT RESET step, or the DISABLED step, the link down may correspond to an intentional link down by the host. However, when the step right before changing to the DETECT step is the CONFIGURATION step or the RECOVERY step, the link down may correspond to a sudden link down that is not intended by the host.

Figure 8:
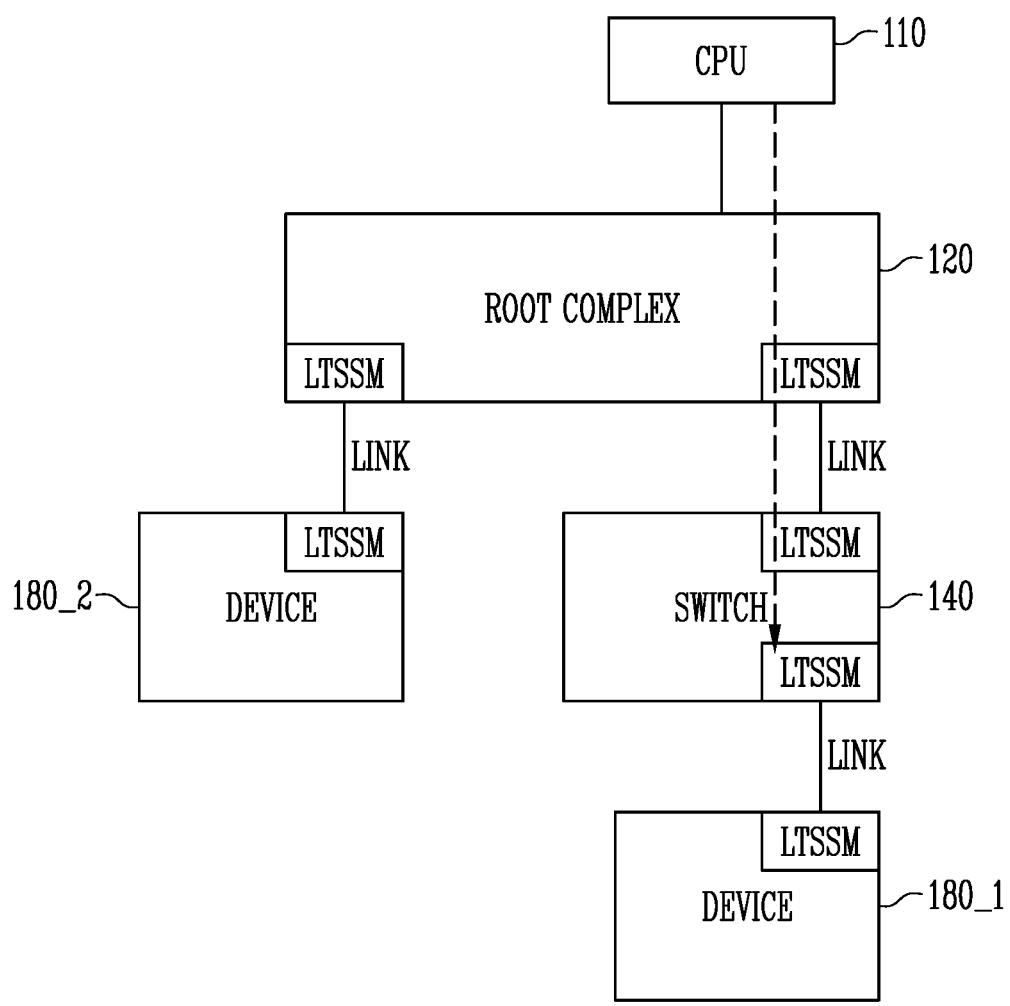
FIG. 8 is a diagram illustrating Link Training & Status State Machines (LTSSMs) relating to an intentional link down by a host according to an embodiment of the present disclosure.

FIG. 8 is a diagram illustrating Link Training & Status State Machines (LTSSMs) relating to an intentional link down by a host according to an embodiment of the present disclosure.

Referring to FIGS. 4 and 8, FIG. 8 illustrates that a CPU 110 of FIG. 4 that performs a HOT RESET through the PCIe register of the downstream port of a switch 140. The downstream port may be farther away from the root complex 120 compared with other ports of the switch 140. The downstream port may synchronize LTSSM transitions by exchanging training sequences (e.g., TS1 and TS2) with a device 180_1. The HOT RESET step may refer to a step in which a link is reset.

According to an embodiment, the HOT RESET step may be carried out by the PCIe register of the downstream port. After the HOT RESET step, a link up may be performed. In other words, an LTSSM may proceed to the DETECT step from the HOT RESET step.

Therefore, since the step before transitioning to the DETECT step is the HOT RESET process, the link down may be a link down that is intended by the host.

Figure 9:
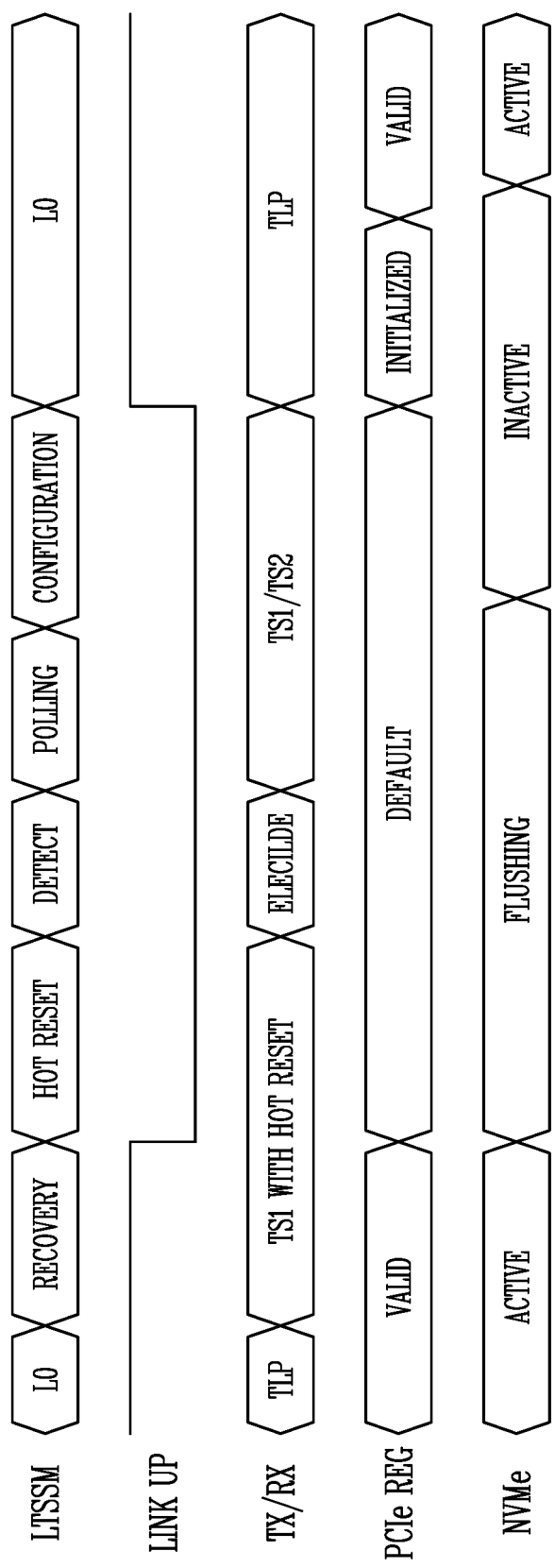
FIG. 9 is a diagram illustrating an operation of a PCIe interface device when a link down is intended by a host according to an embodiment of the present disclosure.

FIG. 9 is a diagram illustrating an operation of a PCIe interface device when a link down is intended by a host according to an embodiment of the present disclosure.

Referring to FIGS. 7 and 9, FIG. 9 illustrates states of a PCIe register (PCIe REG) and an NVMe in a process of re-establishing a link up when, from among the examples of a link down intended by the host of FIG. 7, a link down transitions from a RECOVERY step to a HOT RESET step.

According to an embodiment, an LTSSM may change from an L0 step, through a RECOVERY step, to a HOT RESET step. Since a step right before transitioning to a DETECT step is the HOT RESET step, the link down may be intended by the host. The LTSSM may reset the link in the HOT RESET step and transition again to the DETECT step. Subsequently, the LTSSM may enter the L0 step after a POLLING step and a CONFIGURATION step, and may re-establish a link up.

According to an embodiment, in the L0 step, the transmitter TX and the receiver RX of both ports may transmit or receive transaction layer packets (TLPs). However, in the RECOVERY step and the HOT RESET step, the transmitter TX and the receiver RX of both ports may transmit and receive TS1 (TS1 WITH HOT RESET), and in the DETECT step, the transmitter TX and the receiver RX may be in an electrically idle state (ELECIDLE).

Subsequently, in the POLLING step and the CONFIGURATION step, the transmitter TX and the receiver RX of both ports may transmit and receive TS1 and TS2 to differentiate a lane enabling data communication and to check the connection state of the lane. According to an embodiment, when the LTSSM enters the L0 step, the transmitter TX and the receiver RX of both ports may transmit or receive the transaction layer packets (TLPs).

According to an embodiment, the PCIe register (PCIe REG) may be valid (VALID) in the L0 step and the RECOVERY step, but may change to a default state (DEFAULT) when the LTSSM enters the HOT RESET step from the RECOVERY step. Subsequently, when the LTSSM enters the L0 step, the PCIe register (PCIe REG) may be initialized (INITIALIZED) and change to a valid state (VALID). In other words, when an intentional link down by the host occurs, the PCIe register (PCIe REG) may be initialized.

According to an embodiment, when the NVMe has an active state (ACTIVE) during the LTSSM transition from the L0 step to the RECOVERY step, or during a transition from the RECOVERY step to the HOT RESET step, the NVMe may flush an ongoing command. Subsequently, when the NVMe changes to an inactive state (INACTIVE) in the CONFIGURATION step, and the PCIe register (PCIe REG) is initialized (INITIALIZED), the NVMe may return to the active state (ACTIVE). In other words, when an intentional link down by the host occurs, the NVMe may perform a flush before activation.

For example, after flushing of the command is completed, the NVMe may change to an inactive state (INACTIVE) and pass through the CONFIGURATION step, and the link up may be completed in the L0 step. Then, when the PCIe register (PCIe REG) is initialized (INITIALIZED), the NVMe may be changed back to the active state (ACTIVE) by the host.

When the host sends a config request to the NVMe, if the NVMe is flushing a command, then the NVMe may ignore the config request by returning a configuration request retry status (CRS). When the host sends the config request to the NVMe, if the NVMe has finished flushing the command, then the NVMe may send a success return (SR) and be initialized.

As a result, the OS and the driver may perceive a link down intended by the host, so the PCIe register (PCIe REG) and the NVMe may be initialized and activated.

Figure 10:
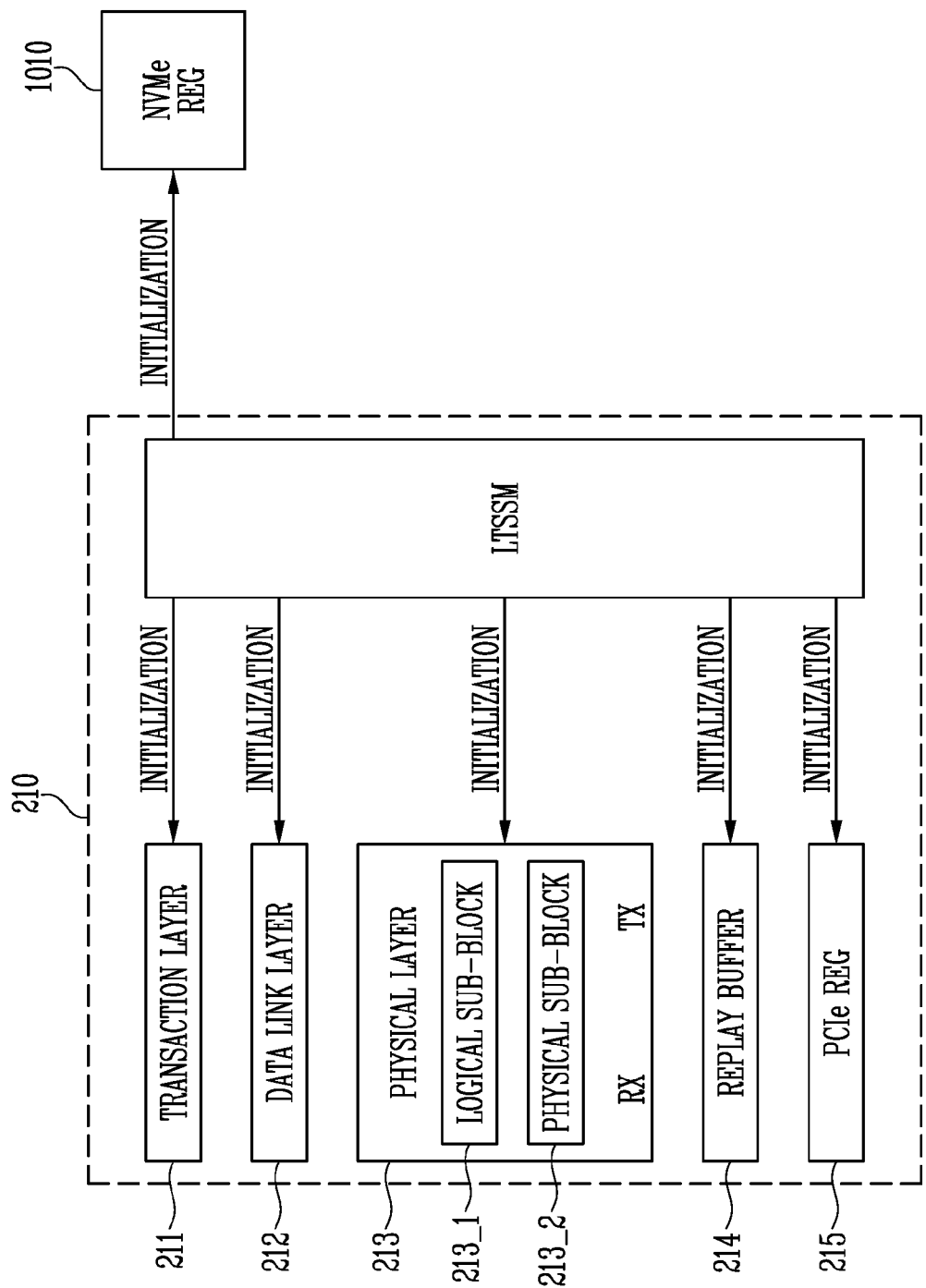
FIG. 10 is diagram illustrating an operation of a PCIe interface device of FIG. 9 according to an embodiment of the present disclosure.

FIG. 10 is diagram illustrating an operation of a PCIe interface device of FIG. 9 according to an embodiment of the present disclosure.

Referring to FIGS. 3 and 10, FIG. 10 illustrates the layers (211, 212, and 213) included in a PCIe component 1 (210) of FIG. 3, a replay buffer 214, a PCIe register 215, and a non-volatile memory express register (NVMe REG) 1010. Referring to FIGS. 9 and 10, FIG. 10 illustrates operations of an LTSSM for a link down that is intended by the host of FIG. 9. The replay buffer 214 of FIG. 10 may be a retry buffer that stores transaction layer packets (TLPs) for re-transmission. The NVMe register (NVMe REG) 1010 may be included in an NVMe module.

According to an embodiment, when an intentional link down by the host occurs, the LTSSM may initialize the transaction layer 211, the data link layer 212, the physical layer 213, the PCIe register 215, and the NVMe register 1010 (INITIALIZATION).

The LTSSM may initialize the NVMe register 1010 by performing an NVMe reset through a link down interrupt. If the NVMe is executing a command, then the NVMe may flush the command being executed. When flushing of the command is completed, the NVMe may perform initialization again through a PCIe inbound path.

According to an embodiment, when an intentional link down by the host occurs, the LTSSM may return an error with respect to every transaction to the transaction layer 211, and may perform initialization after the error return is completed.

Figure 11:
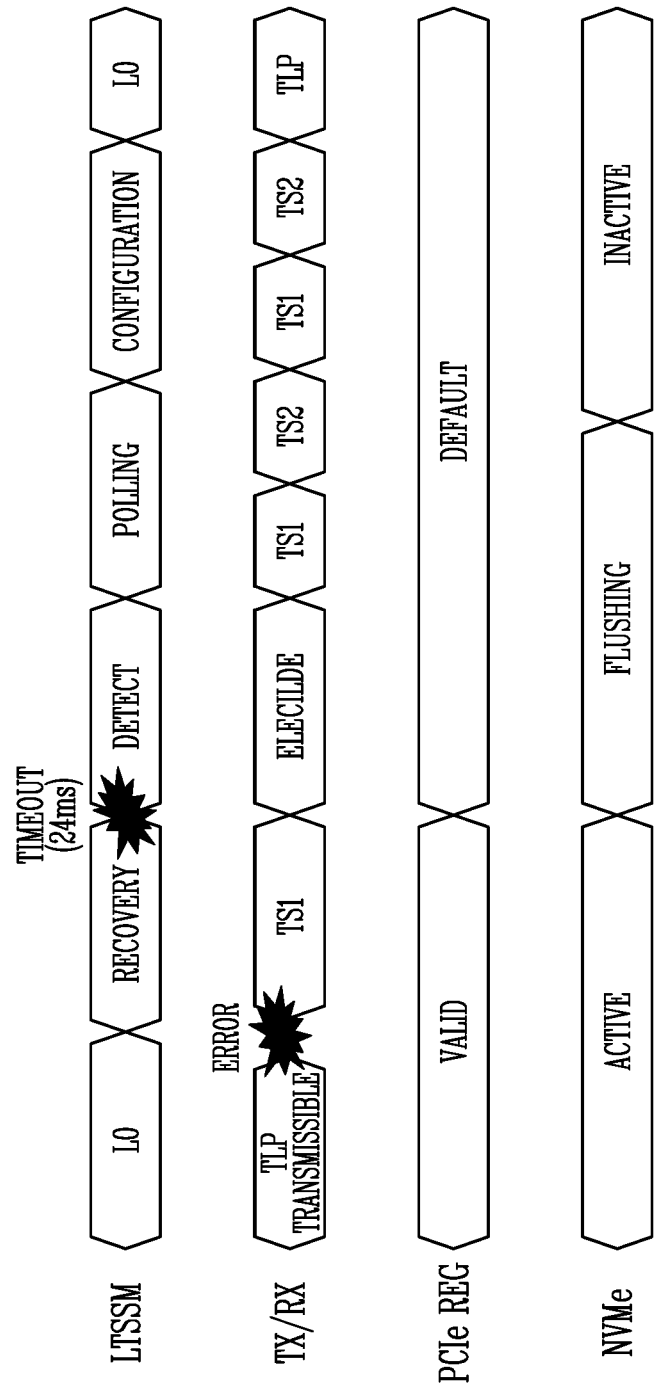
FIG. 11 is a diagram illustrating an operation of a PCIe interface device when a link down is not intended by a host according to an embodiment of the present disclosure.

FIG. 11 is a diagram illustrating an operation of a PCIe interface device when a link down is not intended by a host according to an embodiment of the present disclosure.

Referring to FIGS. 7 and 11, FIG. 11 illustrates states of a PCIe register (PCIe REG) and an NVMe in a process of re-establishing a link up when, from among the examples of a link down that is not intended by the host of FIG. 7, a link down transitions from a RECOVERY step directly to a DETECT step.

According to an embodiment, an LTSSM may change from the RECOVERY step to the DETECT step. For example, the LTSSM may change from the RECOVERY step to the DETECT step when a timeout, such as for example twenty-four milliseconds (24 ms), occurs due to an error in the RECOVERY step.

Since a step right before transitioning to the DETECT step is the RECOVERY step, a link down may correspond to a sudden link down that is not be intended by the host. Subsequently, the LTSSM may enter the L0 step through a POLLING step and a CONFIGURATION step, and may establish a link up again.

According to an embodiment, in the L0 step, the transmitter TX and the receiver RX of both ports may transmit or receive transaction layer packets (TLP TRANSMISSIBLE). However, due to errors (ERROR), the transmitter TX and the receiver RX of both ports may transmit or receive TS1 in the RECOVERY step and may be in an electrically idle state (ELECIDLE) in the DETECT step.

Subsequently, in the POLLING step and the CONFIGURATION step, the transmitter TX and the receiver RX of both ports may transmit and receive TS1 and TS2 to differentiate a lane, from among the detected lanes, enabling data communication and may check the connection state of the lane. When the LTSSM enters the L0 step again, the transmitter TX and the receiver RX of both ports may transmit or receive the transaction layer packets (TLPs).

According to an embodiment, the PCIe register (PCIe REG) may be valid (VALID) in the L0 step and the RECOVERY step, and may change to a default state (DEFAULT) from the valid state (VALID) due to the LTSSM TIMEOUT. In other words, when unintentional link down by the host occurs, the PCIe register (PCIe REG) may be changed to the default state (DEFAULT), which is maintained.

According to an embodiment, the NVMe, which is in an active state (ACTIVE) in the L0 step and the RECOVERY step, may flush a command being executed. Subsequently, in the CONFIGURATION step, the NVMe may be changed into an inactive state (INACTIVE), which is maintained.

When an unintentional link down by the host occurs, the PCIe register (PCIe REG) may be initialized and the NVMe may be reset. As the PCIe register (PCIe REG) is initialized, information about base address registers (BARs) may be initialized.

Therefore, it may be impossible to check a TLP address, and it may be impossible to access the NVMe register with the TLP. Thus, an operation corresponding to an NVMe command may be impossible. As a result, a blue screen of death (BSOD) may occur.

However, according to the present disclosure, when an unintentional link down by the host occurs, the PCIe register (PCIe REG) and the NVMe register may be maintained without being initialized, thereby preventing the generation of the BSOD.

Figure 12:
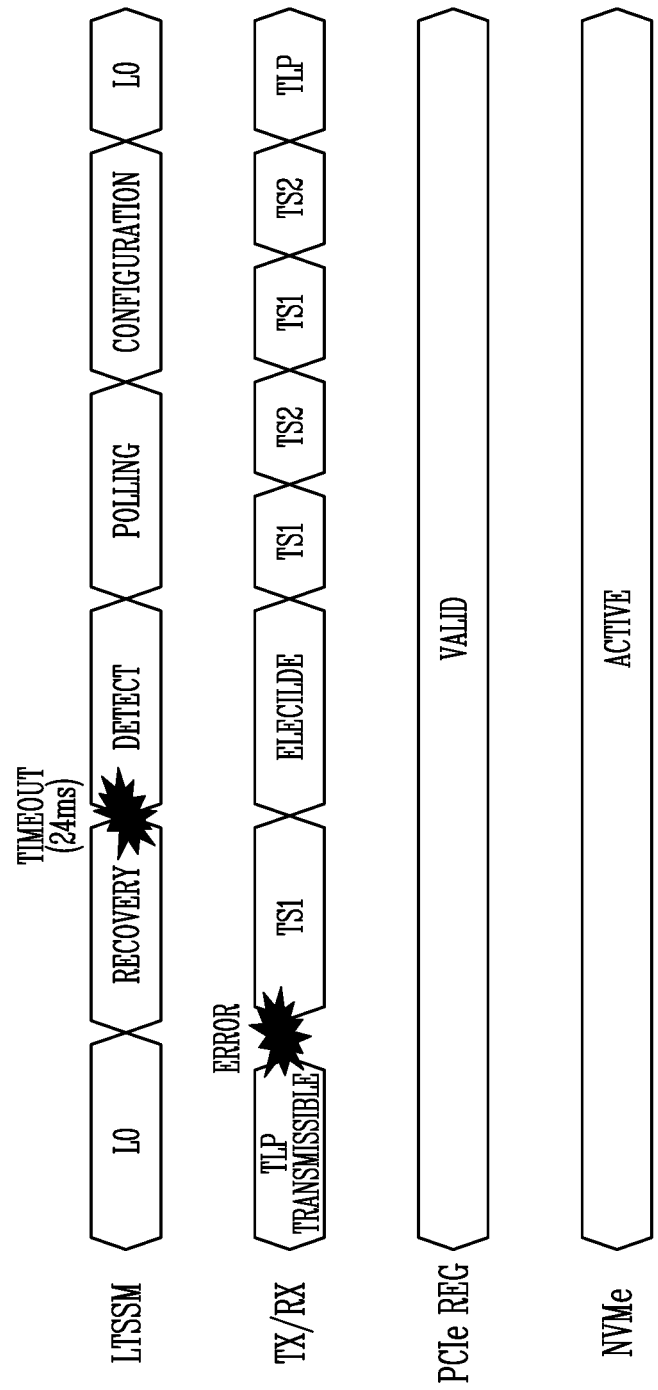
FIG. 12 is a diagram illustrating an operation of a PCIe interface device when a link down is not intended by a host according to an embodiment of the present disclosure.

FIG. 12 is a diagram illustrating an operation of a PCIe interface device when a link down is not intended by a host according to an embodiment of the present disclosure.

Referring to FIGS. 7 and 12, FIG. 12 illustrates states of a PCIe register (PCIe REG) and an NVMe in a process of re-establishing a link up when, from among the examples of a sudden link down not intended by the host of FIG. 7, a link down transitions from a RECOVERY step directly to a DETECT step.

Referring to FIGS. 11 and 12, FIG. 12 is substantially the same as FIG. 11, except for the states of a PCIe register (PCIe REG) and an NVMe. Thus, redundant descriptions will be omitted to simplify the description of FIG. 12.

According to an embodiment, unlike FIG. 11, even when an LTSSM TIMEOUT occurs, the PCIe register (PCIe REG) may maintain a valid state (VALID). In addition, even when the LTSSM TIMEOUT occurs, the NVMe may maintain an active state (ACTIVE).

Since the PCIe register (PCIe REG) maintains a valid state (VALID) and the NVMe maintains an active state (ACTIVE), the NVMe may perform an operation corresponding to a new NVMe command as well as an operation corresponding to the current command being executed.

Figure 13:
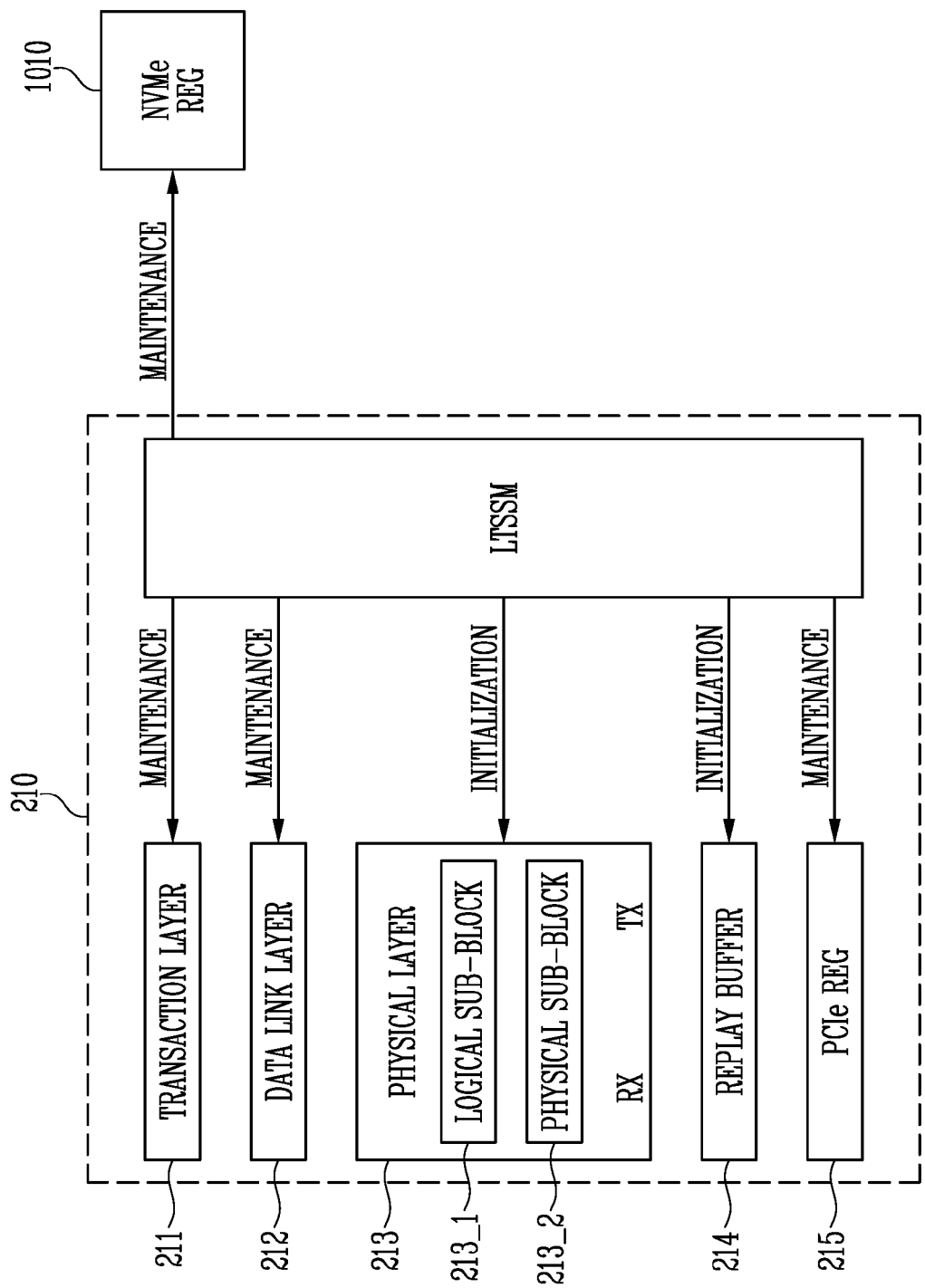
FIG. 13 is diagram illustrating an operation of a PCIe interface device of FIG. 12 according to an embodiment of the present disclosure.

FIG. 13 is diagram illustrating an operation of a PCIe interface device of FIG. 12 according to an embodiment of the present disclosure.

Referring to FIGS. 3 and 13, FIG. 13 illustrates the layers 211, 212, and 213 included in a PCIe component 1 (210) of FIG. 3, a replay buffer 214, a PCIe register 215, and a non-volatile memory express register (NVMe REG) 1010. Referring to FIGS. 12 and 13, FIG. 13 illustrates operations of an LTSSM for a link down that is not intended by the host of FIG. 12. The unintentional link down by the host may be a sudden link down. The replay buffer 214 as shown in FIG. 13 may be a retry buffer that stores transaction layer packets (TLPs) for re-transmission. The NVMe register 1010 may be included in an NVMe module.

According to an embodiment, when an unintentional link down by the host occurs, contrary to an intentional link down by the host, the LTSSM may initialize the physical layer 213 and the replay buffer 214 (INITIALIZATION) and may maintain the transaction layer 211, the data link layer 212, the PCIe register 215, and the NVMe register 1010 (MAINTENANCE). If any data is lost during the initialization of the physical layer 213 and the replay buffer 214, then the LTSSM may transmit the data loss as an AXI error to the NVMe module. The LTSSM may maintain the NVMe register 1010 through a sudden link down interrupt and perform an operation corresponding to a command in which the AXI error occurs.

According to an embodiment, when an unintentional sudden link down occurs, which is not intended by the host, all of the PCIe control registers may be maintained, whereas only some of the PCIe Status/Capability registers may be maintained. A link speed and a negotiated link width of the PCIe Status/Capability register may be initialized. Selectively, a correctable error state of the AER by the sudden link down may be initialized.

According to an embodiment, when a sudden link down that is not intended by the host occurs, the NVMe may execute an ongoing command. When an error returns to the NVMe from the PCIe component due to a timeout (TIMEOUT), if a link up is re-established, then the NVMe may perform an operation corresponding to the command again.

In addition, when the LTSSM returns to the L0 step and the link up is re-established, the NVMe may resume executing the ongoing command.

As a result, when a sudden link down occurs that is not intended by the host, interruptions of the operations of the OS or the NVMe driver may be prevented by maintaining the PCIe register 215 and the NVMe register 1010.

FIG. 14 is a diagram illustrating a method of operating a PCIe interface device according to an embodiment of the present disclosure.

Referring to FIG. 14, at step S1401, an LTSSM may be in a link up state. A link up may refer to transitioning from a DETECT step through a POLLING step and a CONFIGURATION step to an L0 step. In addition, a link up may refer to a state in which a link up register at each step is set to '1.'

At step S1403, the LTSSM may be in a link down state. A link down state may indicate that a different step transitions to the DETECT step. In addition, link down may refer to a state in which the link up register at each step is set to '0.'

According to an embodiment, a link down may be a link down that is intended by the host and a sudden link down that is not intended by the host. An intentional link down by the host may mean that the LTSSM changes from the link up state to the link down state in response to a request by the host. A sudden link down, which is not intended by the host, is not be requested by the host, and may mean that the LTSSM transitions to the DETECT step due to a timeout caused by failures to change data transmission and reception rates, failures to change a lane, or failures to terminate power saving.

At step S1405, the LTSSM may determine whether the link down is requested by the host or not. When the link down is requested by the host (Y), the process may proceed to step S1407. When the link down is not requested by the host (N), i.e., when the link down is a sudden link down, the process may proceed to step S1409.

At step S1407, the LTSSM may initialize the PCIe register and the NVMe register. According to an embodiment, a link down intended by the host may result in data that is flushed by NVMe register and resetting of the PCIe register and the NVMe register. Therefore, the LTSSM may initialize the PCIe register and the NVMe register.

At step S1409, the LTSSM may maintain the PCIe register and the NVMe register. According to an embodiment, the OS and the NVMe driver may not be able to perceive a link down that is not requested by the host. Therefore, in order to prevent a blue screen or interruptions of the operations of the host due to the reset values, the LTSSM may maintain the PCIe register and the NVMe register.

According to the present disclosure, a PCIe interface device capable of completing processing of a command when a link down that is not intended by a host occurs and methods of operating the PCIe interface device are provided.

In the above-discussed embodiments, all steps may be selectively performed or skipped. In addition, the steps in each embodiment may not always be performed in regular order. Furthermore, the embodiments disclosed in the present specification and the drawings aim to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure. It will be apparent to those skilled in the art that various modifications can be made to the above-described exemplary embodiments of the present disclosure without departing from the spirit or scope of the invention. Thus, it is intended that the present disclosure cover all such modifications provided they come within the scope of the appended claims and their equivalents.

What is claimed is:

1. A Peripheral Component Interconnect Express (PCIe) interface device, comprising:
   a transaction layer generating a transaction packet for transmission of a transaction;
   a data link layer generating a link packet including a protection code and a sequence number for the transaction packet, based on the transaction packet;
   a physical layer generating a physical packet based on the link packet and sequentially outputting the physical packet;
   a link training module for performing a negotiation for a link coupled through the physical layer, the link training module determining whether a link down, which occurs when a negotiation of a link does not occur, is a link down requested by a host or a link down not requested by the host; maintaining a data information when the link down is not requested by the host; and initializing the data information when the link down is requested by the host; and
   a PCIe register storing information about the transaction layer, the data link layer, the physical layer, and the link training module.

2. The PCIe interface device of claim 1, wherein the link training module performs one of a plurality of steps and sets a link up register value corresponding to one of the plurality of steps when performing the negotiation for the link, and
   wherein the one of the plurality of steps is one of a DETECT step, a POLLING step, a CONFIGURA- TION step, an L0 step, an L0s step, an L1 step, an L2 step, a RECOVERY step, a LOOPBACK step, a HOT RESET step, and a DISABLED step.

3. The PCIe interface device of claim 2, wherein the link training module stores information about a step right before a change when the link up register value changes from '1' to '0'.

4. The PCIe interface device of claim 3, wherein the link down is a link down requested by the host when the step right before the change is the LOOPBACK step, the HOT RESET step, or the DISABLED step.

5. The PCIe interface device of claim 3, wherein when the link up register value changes from '1' to '0', the link training module identifies the step right before the change if a step after the change is the DETECT step.

6. The PCIe interface device of claim 5, wherein the link down is a link down requested by the host when the step right before the change is the L2 step, the HOT RESET step, or the DISABLED step.

7. The PCIe interface device of claim 5, wherein the link down is a sudden link down when the step right before the change is the CONFIGURATION step or the RECOVERY step and the sudden link down is a link down not requested by the host.

8. The PCIe interface device of claim 7, wherein the link training module initializes the physical layer and maintains the transaction layer and the data link layer when the link down is the sudden link down.

9. The PCIe interface device of claim 7, further comprising a replay buffer storing the transaction packet for re-transmission,
wherein the link training module initializes the replay buffer when the link down is the sudden link down.

10. The PCIe interface device of claim 7, wherein the link training module maintains the data information stored in the PCIe register when the link down is the sudden link down.

11. The PCIe interface device of claim 7, wherein the link training module maintains the data information stored a non-volatile memory express (NVMe) register included in an NVMe module coupled to an endpoint.

12. A method of operating a Peripheral Component Interconnect Express (PCIe) interface device, the method comprising:
generating, by a transaction layer, a transaction packet to transmit a transaction;
generating, by a data link layer, a link packet including a protection code and a sequence number for the transaction packet on the basis of the transaction packet;
generating, by a physical layer, a physical packet on the basis of the link packet, and sequentially outputting the physical packet;
performing negotiation for a link coupled through the physical layer by transmitting and receiving the physical packet;
maintaining a data information about the transaction layer, the data link layer, the physical layer and the link training module when a link down, which occurs when a negotiation of a link does not occur, is not requested by a host; and
initializing the data information when a link down, which occurs when a negotiation of a link does not occur, is requested by the host.

13. The method of claim 12, wherein the performing of the negotiation for the link comprises:
performing one of a plurality of steps; and
setting a link up register value corresponding to one of the plurality of steps, and
wherein the one of the plurality of steps is one of a DETECT step, a POLLING step, a CONFIGURATION step, an L0 step, an L0s step, an L1 step, an L2 step, a RECOVERY step, a LOOPBACK step, a HOT RESET step, and a DISABLED step.

14. The method of claim 13, wherein the setting of the link up register value comprises storing information about a step right before a change when the link up register value changes from '1' to '0'.

15. The method of claim 14, wherein the performing of the negotiation for the link comprises identifying the step right before the change if a step after the change is the DETECT step when the link up register value changes from '1' to '0'.

16. The method of claim 15, wherein the link down is requested by the host when the step right before the change is the L2 step, the HOT RESET step, or the DISABLED step.

17. The method of claim 15, wherein the link down is a sudden link down when the step right before the change is the CONFIGURATION step or the RECOVERY step and the sudden link down is a link down that is not requested by the host.

18. The method of claim 17, wherein the performing of the negotiation for the link comprises initializing the physical layer and maintaining the transaction layer and the data link layer when the link down is the sudden link down.

19. The method of claim 17, wherein the performing of the negotiation for the link comprises maintaining the data information stored in a PCIe register when the link down is the sudden link down.

20. The method of claim 17, wherein the performing of the negotiation for the link comprises maintaining the data information stored in a non-volatile memory express (NVMe) register included in an NVMe module coupled to an endpoint.

* * * * *